United States Patent
Liou et al.

(10) Patent No.: US 7,689,375 B2
(45) Date of Patent: Mar. 30, 2010

(54) POSITION DETECTING SYSTEM AND METHOD FOR ELECTRONIC DEVICE

(75) Inventors: Juen Liou, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 392 days.

(21) Appl. No.: 11/933,903

(22) Filed: Nov. 1, 2007

(65) Prior Publication Data

US 2009/0119059 A1    May 7, 2009

(51) Int. Cl.
*G06F 19/00* (2006.01)
*G06F 17/40* (2006.01)

(52) U.S. Cl. .................. 702/81; 700/109; 700/115; 702/182; 702/187

(58) Field of Classification Search .......... 250/200, 250/206, 206.2, 215; 367/191; 381/124, 381/150; 700/90, 95, 108, 109, 112, 115, 700/117, 302; 702/1, 81, 82, 83, 84, 108, 702/117, 127, 150, 182, 187, 188, 189
See application file for complete search history.

(56) References Cited

U.S. PATENT DOCUMENTS

| | | | | |
|---|---|---|---|---|
| 2,767,914 | A * | 10/1956 | Merrill et al. | 702/82 |
| 3,237,100 | A * | 2/1966 | Chalfin et al. | 324/108 |
| 6,838,992 | B2 * | 1/2005 | Tenarvitz | 340/573.1 |
| 2004/0183682 | A1 * | 9/2004 | Tenarvitz | 340/573.1 |
| 2007/0072599 | A1 * | 3/2007 | Romine et al. | 455/423 |

* cited by examiner

*Primary Examiner*—Edward R Cosimano
(74) *Attorney, Agent, or Firm*—Morris, Manning & Martin LLP; Tim Tingkang Xia

(57) ABSTRACT

A position detecting system and method for an electronic device used an audio signal input module of the electronic device and a signal receiver to connect to the audio signal input module convert an external position signal into an audio signal. A position detecting software running on the electronic device analyzes the audio signal. Accordingly, the current position of the electronic device is obtained. The audio signal input module of the electronic device is employed as an input port for the external position signal, thus saving the construction cost of the system. Besides, the current position of the electronic device with an ever-changing position can be obtained during a test process, such that the electronic device can start or stop a test item accordingly.

14 Claims, 3 Drawing Sheets

POSITION DETECTING SYSTEM AND METHOD FOR ELECTRONIC DEVICE

BACKGROUND OF THE INVENTION

1. Field of Invention

The present invention relates to a position detecting system and method for an electronic device, and more particularly to a system and method for obtaining the current position of an electronic device with an ever-changing position during a test process.

2. Related Art

When manufacturers purchase all parts of an electronic device, they will first carry out an incoming inspection, and then perform a finished product test after the products are assembled and ready for delivery, so as to ensure all parts of the electronic device work normally.

Generally speaking, the final product test for electronic device is testing an electronic device on a conveyer belt for several hours. The electronic device undergoes various tests, such as wireless network card test, bluetooth receiver test, and the like, on the conveyer belt during the final product test. On delivery, as hundreds and thousands of electronic devices are to be delivered, in order to control the delivery date, usually thousands of electronic devices are put on the conveyer belt to be subjected to the finished product test for all parts. However, if the wireless network card test or the bluetooth receiver test are performed on so many electronic devices on the conveyer belt at the same time, the wireless network access point (AP) or the bluetooth transmitter hardly meet the service requirement of all the electronic devices. Therefore, different tests are performed in separate regions of the conveyer belt. For example, the electronic devices passing through the wireless network card test region on the conveyer belt are subjected to the wireless network card test, or the electronic devices passing through the bluetooth receiver test region on the conveyer belt are subjected to the bluetooth receiver test.

Thus, the current position of the electronic device must be obtained, so that the electronic device can start or stop the function of a test item at a specific position during a test process.

SUMMARY OF THE INVENTION

In view of the above, the present invention provides a position detecting system and method for an electronic device, for obtaining a current position of an electronic device with an ever-changing position during a test process, such that the electronic device starts or stops a test item accordingly. Further, according to the present invention, the audio signal input module of the electronic device serves as an input port of an external position signal, and the test can be performed again by simply connecting the signal receiver to the audio signal input module of another electronic device, such that the signal receiver can be used repeatedly, thus saving the construction cost of the system.

The position detecting system for an electronic device of the present invention includes at least one position marker, a position data table, a signal receiver, an audio signal input module, and a position detection software. The at least one position marker is disposed on the moving path, and has a signal emitter for emitting a uniquely identifiable position signal. The frequency of the position signal falls in an audio frequency range of 20 Hz to 20 KHz. The position data table is stored in the electronic device, for recording the frequency of the position signal corresponding to different positions. The signal receiver is disposed on the electronic device. Preferably, the signal receiver receives the position signal merely moving to the position marker, and converts the position signal into an audio signal. The audio signal input module is disposed on the electronic device and connected to the signal receiver, for serving as an input port of the audio signal, and identifying and processing the audio signal to obtain the position signal. The position detection software runs on the electronic device, for analyzing the received position signal, so as to obtain the current position of the electronic device.

The position detecting method for an electronic device of the present invention is suitable for obtaining the current position of an electronic device with an ever-changing position during a test process, such that the electronic device starts or stops a test item accordingly. The method includes the following steps. First, at least one position marker is disposed on the moving path of the electronic device. The position marker has a signal emitter, for emitting a uniquely identifiable position signal, and the frequency of the position signal falls in an audio frequency range of 20 Hz to 20 KHz. The frequency of the position signal corresponding to different positions is recorded in a position data table, and the position data table is stored in the electronic device. A signal receiver is disposed on the electronic device, for receiving the position signal merely moving to the position marker. The position data table is looked up in the electronic device according to the frequency of the position signal, so as to obtain the position information corresponding to the frequency.

In the present invention, the position marker is disposed on the moving path of the electronic device. The signal frequency corresponding to different positions is recorded in a position data table in advance, and the position data table is stored in the electronic device. When the electronic device passes through the position marker, the signal receiver disposed on the electronic device receives a uniquely identifiable position signal emitted by the position marker and converts the position signal into an audio signal. After that, the audio signal is inputted into the electronic device through the audio signal input module disposed on the electronic device and connected to the signal receiver, so that the audio signal is further converted into a position signal. Then, the position detection software analyzes the position signal, and looks up the position data table in the electronic device, so as to obtain the position information corresponding to the frequency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
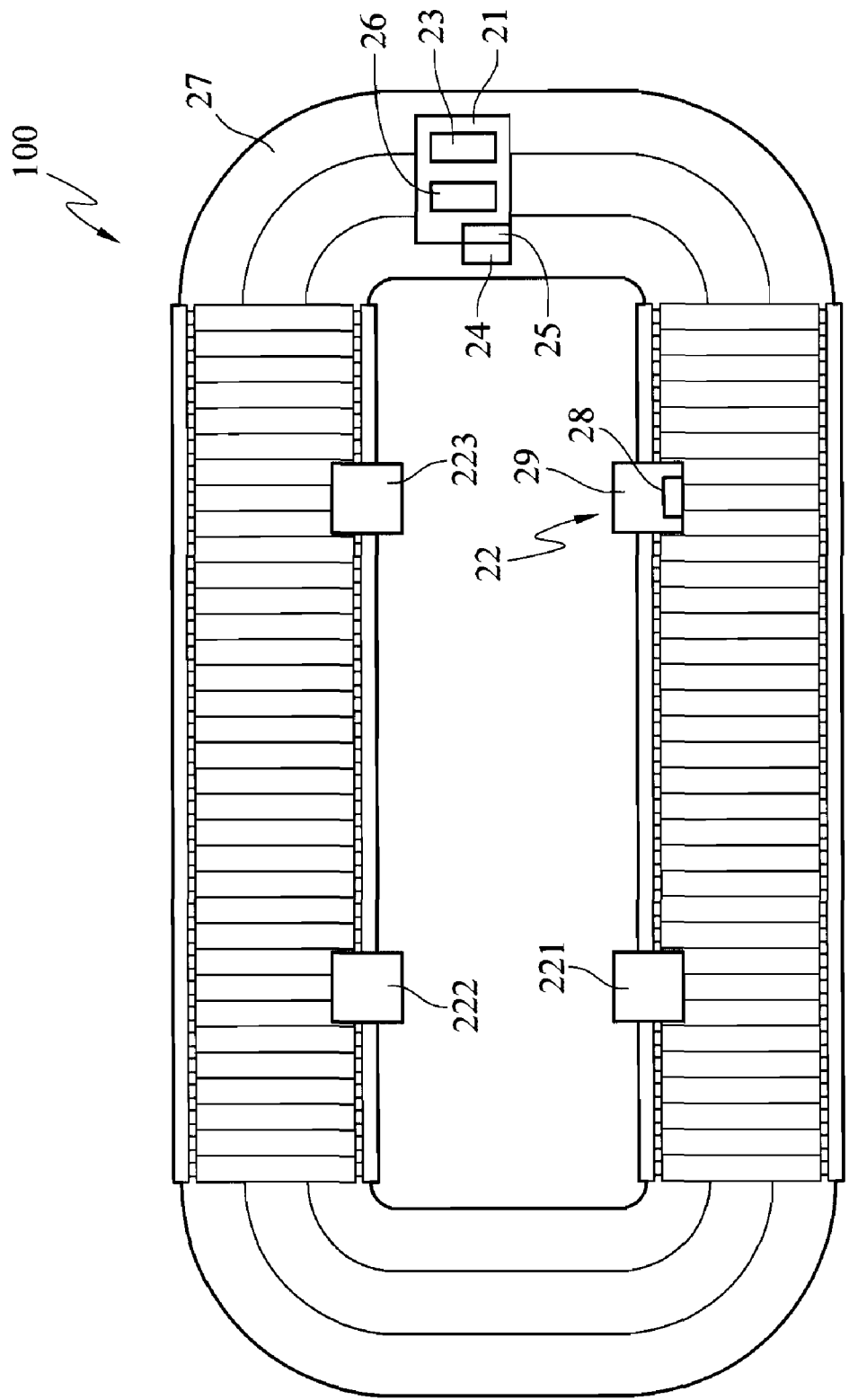
FIG. 1 is a schematic view of the position detecting system for an electronic device according to the present invention.

Referring to FIG. 1, a schematic view of the position detecting system for an electronic device according to the present invention is shown. In FIG. 1, the position detecting system 100 for an electronic device is used for obtaining the current position of an electronic device 21 with an ever-changing position during a test process, such that the electronic device 21 can start or stop a test item accordingly. The position detecting system 100 for an electronic device includes a position marker 22, a position data table 23, a signal receiver 24, an audio signal input module 25, and a position detection software 26.

Figure 2A:
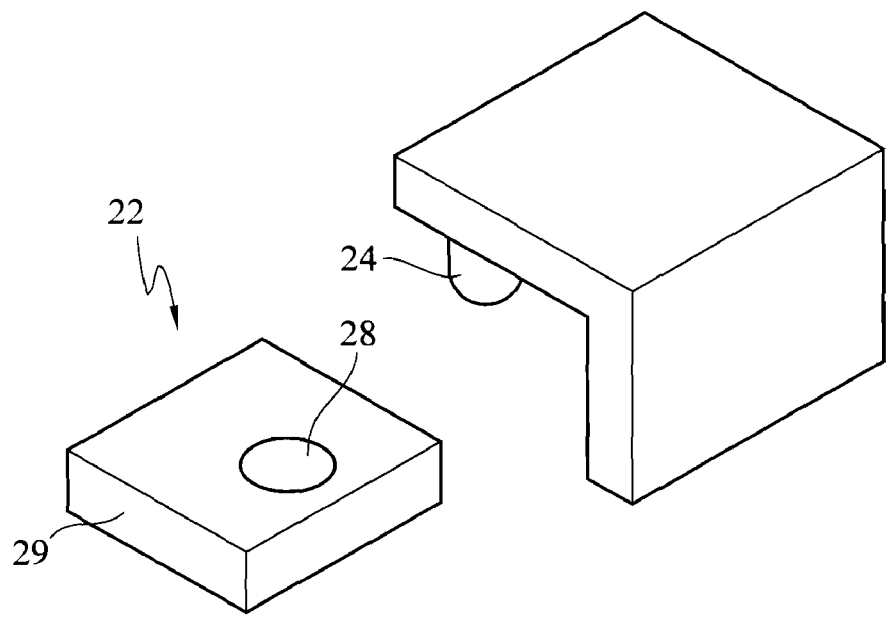
FIG. 2A is a schematic view of the position marker according to the present invention.
Figure 2B:
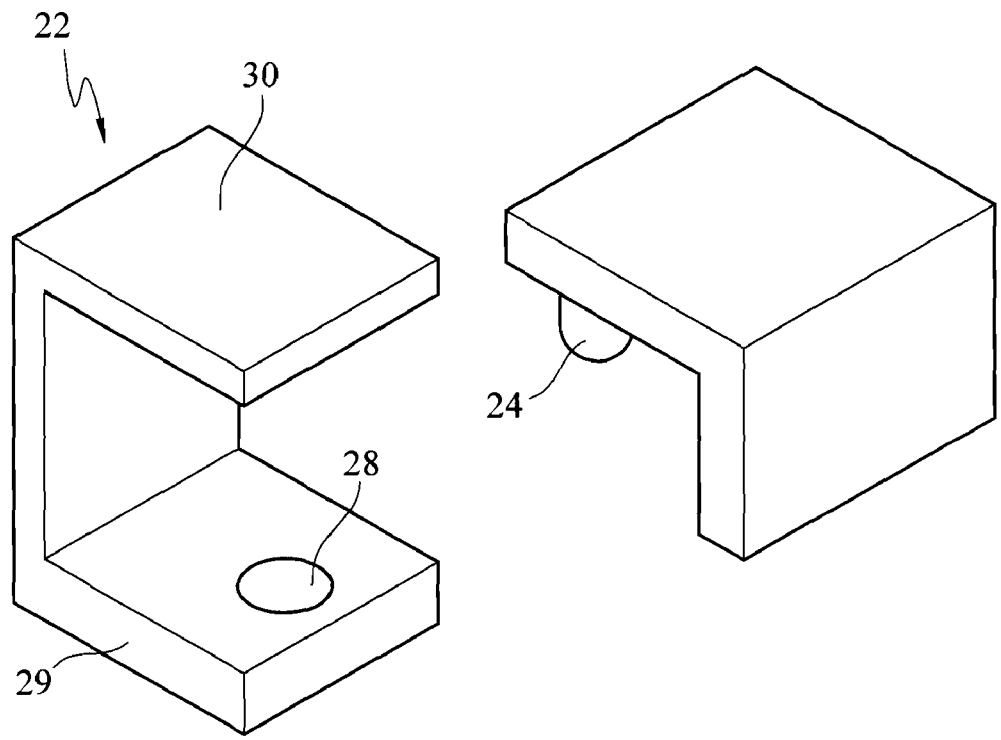
FIG. 2B is another schematic view of the position marker according to the present invention.

The position marker 22 is disposed on a moving path 27 of the electronic device and includes a signal emitter 28. The signal emitter 28 is located on a support base 29, for emitting a uniquely identifiable position signal, and the frequency of the position signal falls in an audio frequency range of 20 Hz to 20 KHz. The signal emitter 28 is an infrared light emitting diode or a laser diode. Referring to FIG. 2A, a schematic view of the position marker according to the present invention is shown. In FIG. 2A, the signal emitter 28 is located on the support base 29. Referring to FIG. 2B, another schematic view of the position marker according to the present invention is shown. In FIG. 2B, the signal emitter 28 is located on the support base 29, and one side of the support base 29 is connected to a shelter 30. The emitting surface of the signal emitter 28 is sheltered from the shelter 30. The signal receiver 24 is allowed to pass between the shelter 30 and the signal emitter 28.

The position data table 23 is stored in the electronic device 21, for recording the frequency of the position signal corresponding to different positions.

The signal receiver 24 is disposed on the electronic device 21, and receives the position signal merely moving to the position marker 22, and converts the position signal into an audio signal. The signal receiver 24 is an infrared receiver or a laser receiver. The frequency range of the audio signal is 20 Hz to 20 KHz that can be received by the audio signal input port 25.

The audio signal input module 25 is disposed on the electronic device 21 and connected to the signal receiver 24, for serving as an input port of the audio signal, and analyzing the audio signal to obtain the position signal. The audio signal input module 25 includes a universal audio signal input port and sound card used in a common electronic device.

The position detection software 26 runs on the electronic device 21, for looking up the position data table 23 according to the received position signal, so as to obtain the current position of the electronic device 21.

The position marker 22 is disposed on the moving path 27 of the electronic device, and has a signal emitter 28 for emitting a uniquely identifiable position signal, and the frequency of the position signal falls in an audio frequency range. A signal frequency corresponding to the position signal is first recorded in a position data table 23, and the position data table 23 is stored in the electronic device 21. The signal receiver 24 is disposed on the audio signal input port 25 of the electronic device 21. When the electronic device 21 with the position receiver 24 moves to the position marker 22, the signal receiver 24 receives the position signal emitted by the signal emitter 28, and converts the position signal into an audio signal. Then, the audio signal is input into the electronic device 21 through the audio signal input module 25. The audio signal input module 25 further converts the audio signal into a position signal. The position detection software 26 running on the electronic device 21 looks up the position data table 23 according to the received position signal, so as to obtain the current position of the electronic device 21. Thereby, the electronic device starts or stops a test item according to its current position. The position detecting system 100 for an electronic device of the present invention further includes a plurality of position markers, for example, 221, 222, 223, disposed on the moving path 27 of the electronic device, and the position markers 221, 222, 223 operated in the same way as the position marker 22. According to the present invention, the current position of the electronic device can be obtained, and the electronic device can start or stop the function of a test item at a specific position during a test. The test item can be a network communication component, such as a wireless network card or bluetooth receiver.

In a preferred embodiment of the present invention, this technique is applied to test a wireless network communication component of an electronic device. In other words, a wireless network communication component is started when the electronic device moves to a specific position, and is then stopped when the electronic device moves to another preset position, so as to determine whether the wireless network communication component works normally. This test method of starting a wireless network communication component only at a specific position can reduce the working load of the wireless network access point, as the wireless network access point is not required to provide serves for all the electronic devices on the test path, thus reducing the working load of the wireless router.

Figure 3:
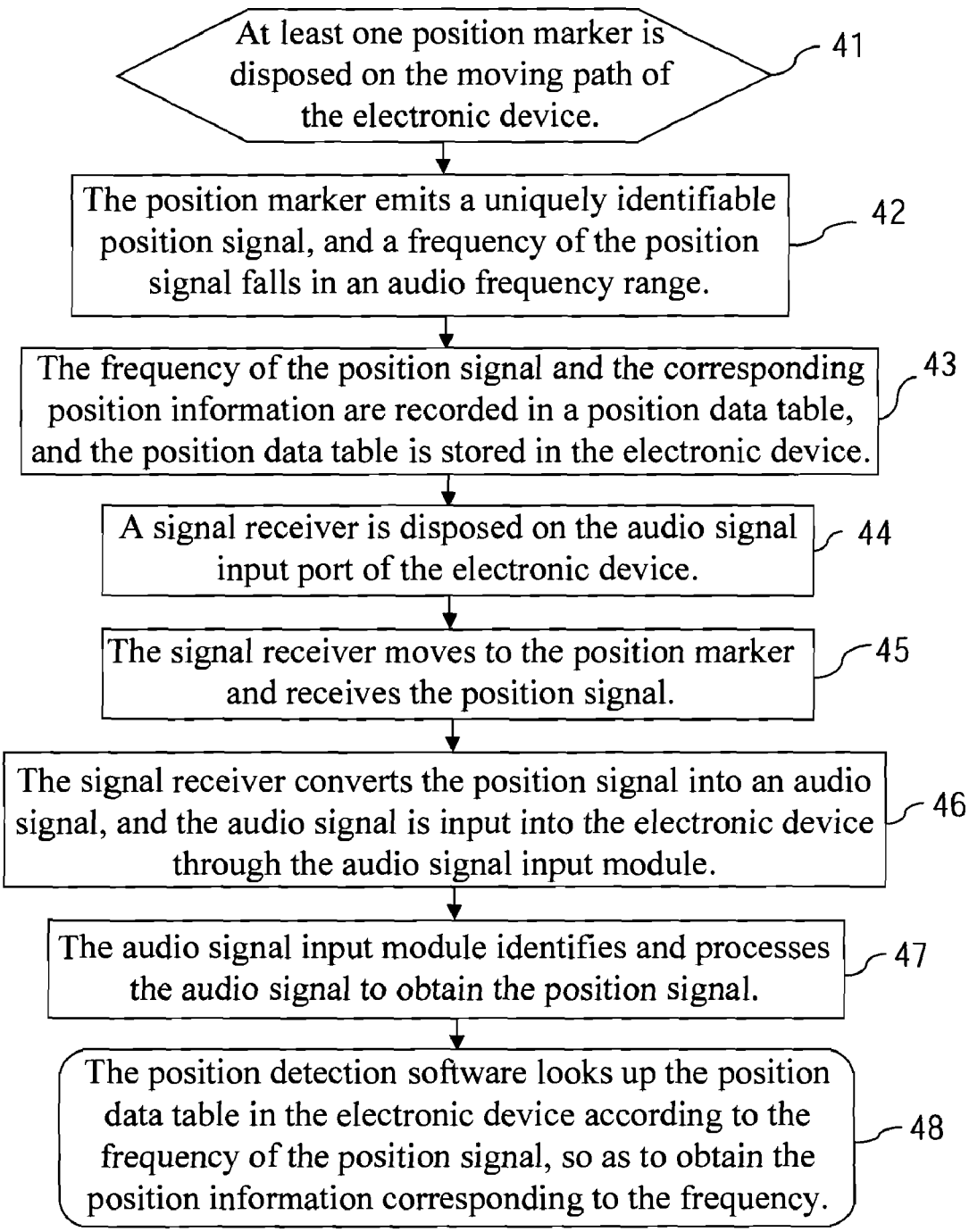
FIG. 3 is a flow chart of the position detecting method for an electronic device according to the present invention.

Referring to FIG. 3, a flow chart of the position detecting method for an electronic device according to the present invention is shown. The position detecting method for an electronic device of the present invention is suitable for obtaining the current position of an electronic device with an ever-changing position during a test, such that the electronic device starts or stops a test item accordingly. The method includes the following steps. First, at least one position marker is disposed on the moving path of the electronic device (Step 41). The position marker emits a uniquely identifiable position signal, and a signal frequency of the position signal falls in an audio frequency range (Step 42). The signal frequency corresponding to different positions is recorded in a position data table, and the position data table is stored in the electronic device (Step 43). A signal receiver is disposed on the audio signal input port of the electronic device (Step 44). The signal receiver moves to the position marker and receives the position signal (Step 45). Then, the signal receiver converts the position signal into an audio signal, and the audio signal is input into the electronic device through the audio signal input module (Step 46). The audio signal input module looks up the audio signal to obtain the position signal (Step 47). The position detection software queries the position data table in the electronic device according to the signal frequency of the position signal, so as to obtain the position information corresponding to the signal frequency (Step 48).

The invention being thus described, it will be obvious that the same may be varied in many ways. Such variations are not to be regarded as a departure from the spirit and scope of the invention, and all such modifications as would be obvious to one skilled in the art are intended to be included within the s cope of the following claims.

What is claimed is:

1. A position detecting system for an electronic device, for obtaining a current position of the electronic device changing its position continuously during test process, such that the electronic device starts or stops a test item accordingly, comprising:

at least one position marker, disposed on a moving path, wherein the position marker has a signal emitter for emitting an uniquely identifiable position signal, and a frequency of the position signal falls in an range of an audio frequency;

a position data table, stored in the electronic device, for recording the frequency of the position signal corresponding to different positions;

a signal receiver, disposed on the electronic device, for receiving the position signal when moving to the position marker, and converting the position signal into an audio signal;

an audio signal input module, disposed on the electronic device and connected to the signal receiver, for serving as an input port for an audio signal, and identifying and processing the audio signal to obtain the position signal; and a position detection software, running in the electronic device, for looking up the position data table according to the received position signal to obtain the current position of the electronic device.

2. The position detecting system for an electronic device as claimed in claim 1, wherein the position marker comprises a support base and a shelter, and one side of the support base is connected to the shelter which the signal emitter is sheltered from, so as the signal receiver can pass between the shelter and the signal emitter.

3. The position detecting system for an electronic device as claimed in claim 1, wherein the signal emitter is an infrared light emitting diode, and the signal receiver is an infrared receiver.

4. The position detecting system for an electronic device as claimed in claim 1, wherein the signal emitter is a laser diode, and the signal receiver is a laser receiver.

5. The position detecting system for an electronic device as claimed in claim 1, wherein the audio signal input module comprises an audio signal input port and a sound card.

6. The position detecting system for an electronic device as claimed in claim 1, wherein the test item is testing for a WLAN card or a bluetooth transmitter.

7. The position detecting system for an electronic device as claimed in claim 1, wherein the audio frequency range is 20 Hz-20 KHz.

8. A position detecting method for an electronic device, for obtaining a current position of the electronic device changing its position continuously during a test process, such that the electronic device starts or stops a test item accordingly, comprising:

disposing at least one position marker on a moving path of the electronic device, wherein the position marker has a signal emitter for emitting a uniquely identifiable position signal, and a signal frequency of the position signal falls in an audio frequency range;

recording the signal frequency corresponding to different positions in a position data table, and storing the position data table in the electronic device;

disposing a signal receiver on the electronic device, wherein the signal receiver receive the position signal merely moving to the position marker; and looking up the position data table in the electronic device according to a frequency of the position signal, so as to obtain position information corresponding to the frequency.

9. The position detecting method for an electronic device as claimed in claim 8, wherein the signal emitter is an infrared light emitting diode, and the signal receiver is an infrared receiver.

10. The position detecting method for an electronic device as claimed in claim 8, wherein the signal emitter is a laser diode, and the signal receiver is a laser receiver.

11. The position detecting method for an electronic device as claimed in claim 8, wherein the audio frequency range is 20 Hz-20 KHz.

12. The position detecting method for an electronic device as claimed in claim 8, wherein a position detection software is used to look up the position data table in the electronic device according to the signal frequency of the position signal, so as to obtain the position information corresponding to the signal frequency.

13. The position detecting method for an electronic device as claimed in claim 8, wherein the signal receiver is connected to an audio signal input module of the electronic device.

14. The position detecting method for an electronic device as claimed in claim 13, wherein the audio signal input module comprises an audio signal input port and a sound card.

* * * * *